No. 747,152. PATENTED DEC. 15, 1903.
T. DRAPER.
COMBINED UNIVERSAL JOINT PIPE COUPLING AND PLUG.
APPLICATION FILED NOV. 15, 1901.
NO MODEL.
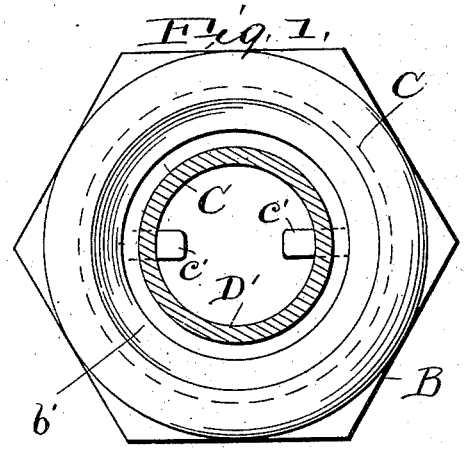
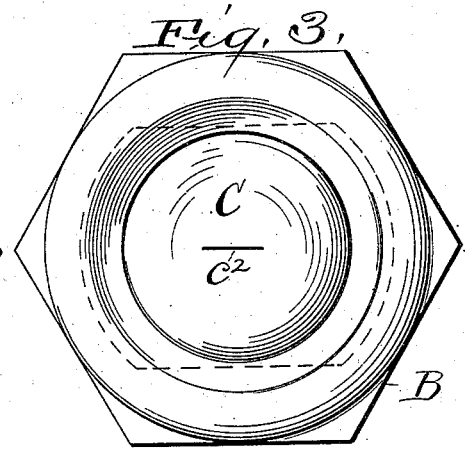
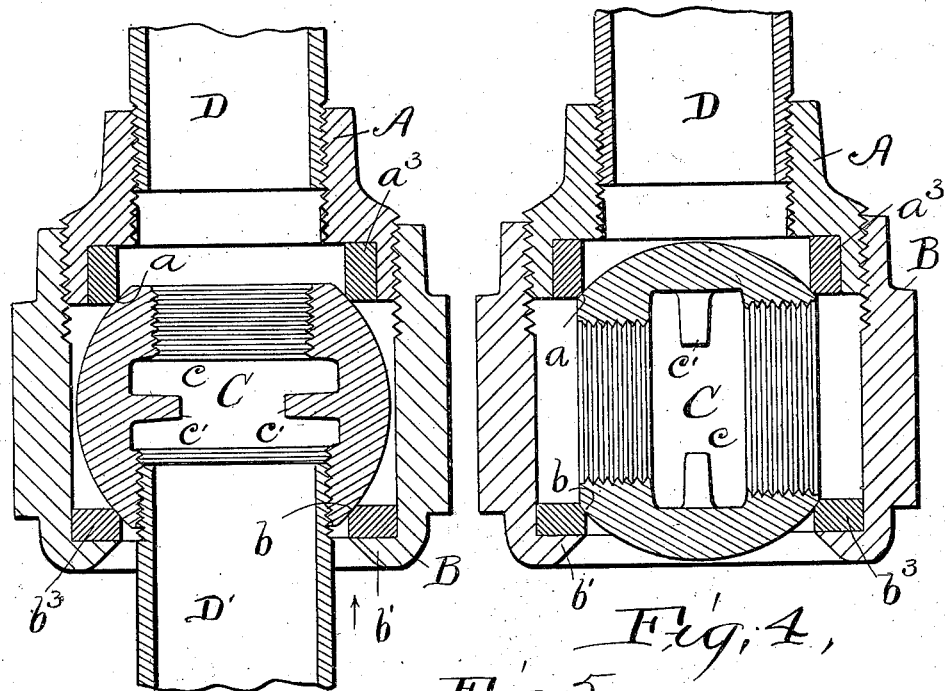
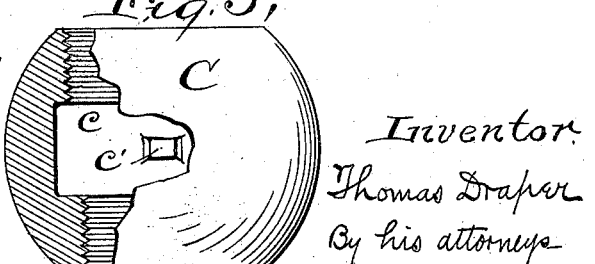
Witnesses:
E. B. Gilchrist
H. M. Wise
Inventor:
Thomas Draper
By his attorneys
Thurston Bates No. 747,152. Patented December 15, 1903.

UNITED STATES PATENT OFFICE.

THOMAS DRAPER, OF PORT HURON, MICHIGAN, ASSIGNOR TO THE DRAPER MANUFACTURING COMPANY, OF PORT HURON, MICHIGAN, A CORPORATION OF MICHIGAN.

COMBINED UNIVERSAL-JOINT PIPE COUPLING AND PLUG.

SPECIFICATION forming part of Letters Patent No. 747,152, dated December 15, 1903.

Application filed November 15, 1901. Serial No. 82,345. (No model.)

*To all whom it may concern:*

Be it known that I, THOMAS DRAPER, a citizen of the United States, residing at Port Huron, in the county of St. Clair and State of Michigan, have invented a certain new and useful Improvement in a Combined Universal-Joint Pipe Coupling and Plug, of which the following is a full, clear, and exact description, reference being had to the accompanying drawings.

The device in which my invention is embodied is intended, primarily, for use as a universal-joint coupling for connecting together two pipe-sections adapted for transmitting fluid under pressure. It is also capable of use to plug or stop the end of one pipe-section. In its best form, as shown, it is capable of use in coupling together pipes of different diameters. As appears from the drawings, the union occupies a very short space lengthwise of the pipe, and it may be connected with the two pipe-sections after they have been placed in the relative positions they are to occupy, or at least it is only necessary to separate their ends a very short distance. It is believed that this is a very desirable practical characteristic of the device.

The invention may be conveniently summarized as consisting in the construction and combination of parts hereinafter described, and pointed out definitely in the claim.

In the drawings, Figure 1 is an end view of the device looking in the direction of the arrow in Fig. 2. Fig. 2 is a longitudinal section of the device when the parts are in the position where the device serves as a pipe-coupling. Fig. 3 is an end view, and Fig. 4 is a longitudinal sectional view, of the device when the parts thereof are so arranged that it acts to stop or plug the end of a pipe-section. Fig. 5 is an elevation, partly broken away, of the ball-valve forming a part of the device.

The device itself consists, essentially, of three members, which are respectively indicated by the reference-letters A, B, and C. The member A contains a spherical valve-seat $a$ and is internally threaded at one end, whereby it may be screwed onto the pipe-section D, which the device is adapted to couple to the pipe-section D. The member B is internally threaded and fitted to the threaded exterior of the member A. Near its opposite end the member B has an inwardly-projecting annular flange $b'$, on which is a spherical valve-seat $b$. The third member is a sphere or ball C of such size as to fit two spherical valve-seats $a\ b$, between which it may be clamped when the two members A and B are screwed together. This ball has a diametrical cylindrical hole $c$ through it. At one end this hole is threaded and is adapted to be screwed onto the other pipe-section $D'$. Within this hole $c$ in the ball, but at such a position that it will not interfere with the screw-threads therein, are the lugs $c'\ c'$, adapted for engagement with a wrench or key or some analogous instrument, whereby the ball may be turned to screw it onto the pipe-section or whereby the ball may be prevented from turning when the pipe is being turned. The two lugs $c'\ c'$ are the preferable means for securing the result stated; but any angular conformation of the hole $c$ capable of coöperation with a wrench or key may be employed instead of said lugs.

Preferably the two spherical valve-seats $a\ b$ in the two members A B, respectively, are formed upon independently-constructed rings $a^3\ b^3$, which are secured in the two members, substantially as shown, by any appropriate means. The hole through the flange $b'$ is larger in diameter than is the pipe-section $D'$, upon which the ball is screwed. It need not be much larger in diameter if it is only desired to permit a very limited universal movement of the pipe-section $D'$ relative to the other pipe-section D. The hole may, however, be made large enough to permit any desired universal adjustment of one pipe-section relative to the other.

The construction described may be also used to plug or stop the end of the pipe-section D. For example, the ball may be unscrewed from the pipe $D'$ and then turned into the position shown best in Fig. 3, where the axis of the hole $c$ through the ball is at right angles to the axis of the pipe D. An unbroken spherical surface will be pressed tightly over the hole in the member A and against the spherical valve-seat $a$ when the member B is screwed on, and this serves to effectively close or plug the end of the member A, and consequently of the pipe D, upon which said member is screwed. The spherical surface adapted to be used for so closing the end of the member A is of course limited by the hole $c$ passing through the ball, and it is necessary that the ball shall occupy pretty exactly the position explained, or otherwise the edge of the hole $c$ may overlap the valve-seat $a$. In order that this adjustment may be made, I place upon the surface of the ball at a point diametrically opposite to the center of the part of the ball which acts as the plug or valve a mark of some sort, which mark when the ball is in the position to act as a plug will be equidistant from all points of the margin of the hole in the member B. A straight line $c^2$, marking a diametric plane at right angles to the hole through the ball, is perhaps as good a mark as any to use for this purpose.

Having described my invention, I claim—

In combination, a member adapted to be secured to the extremity of a pipe, said member having an enlargement and being externally screw-threaded, a ring mounted in said member and having a spherical seat, a second member provided with internal screw-threads for engaging with the screw-threaded portion of said first member, a flange integral with said second member, a ring carried by said flange and having a spherical seat therein, a ball interposed between said rings and having an opening therethrough, said opening being arranged so as to receive different-sized pipe, and lugs within said opening adapted to be engaged by a wrench, substantially as described.

In testimony whereof I hereunto affix my signature in the presence of two witnesses.

THOMAS DRAPER.

Witnesses:
E. B. GILCHRIST,
E. L. THURSTON.